United States Patent Office 3,325,416
Patented June 13, 1967

3,325,416
SYNTHETIC GUM DISPERSIONS
Gordon Trent Hewitt, Upper Montclair, N.J., assignor to Colgate Palmolive Company, New York, N.Y., a corporation of Delaware
No Drawing. Filed Oct. 1, 1963, Ser. No. 312,896
22 Claims. (Cl. 252—161)

This invention relates to dispersions containing synthetic gums and, more specifically, relates to concentrated alkyl cellulose dispersions, processes for making such dispersions and detergent compositions containing the same.

As is well known in the art, it is difficult to form concentrated dispersions of certain synthetic gums known as alkyl cellulose compositions. Difficulty is encountered in dispersing the compositions in suitable solvents. This is particularly true with hydroxypropyl methyl cellulose and carboxy methyl cellulose compositions. For example, when one of the said cellulose compositions is contacted with ethyl alcohol in order to disperse the same in the alcohol, lumps of the cellulose composition are formed and an unsatisfactory dispersion results. When glycerine is used alone in place of ethyl alcohol, a premature swelling of the synthetic gum occurs. It has also been noted that when an aqueous solution of sorbitol, a polyol, is used the synthetic gum swells to such extent that a rubbery composition results. Heretofore the most satisfactory mehod for dispersing or dissolving hydroxypropyl methyl cellulose gum is that of mixing the same thoroughly with hot water (80–90° C.) and then allowing the resulting mixture to stand for a short time; additional water is then added, the water now added, of necessity, being cold or even at ice temperature; and the mixture is then stirred until a smooth dispersion is formed. Unless this two-stage procedure is followed, the synthetic gum is incompletely dissolved in water. One of the serious limitations of the two-stage procedure, however, is the large amount of water required to carry a relatively small amount of synthetic gum. Generally, only about 2–5 percent by weight of the gum can be so dissolved, thus giving rise to relatively low concentration of gum in solution if the final product is to contain other essential ingredients. The present invention is concerned with a technique for overcoming the limitations indicated above and is also directed to concentrated dispersions of the said gum in suitable solvent systems.

It is an object of the present invention, therefore, to provide concentrated dispersions of methyl cellulose compositions. Another object of the invention is to provide a process for preparing such concentrated compositions. A further object is the provision of clear, gel shampoos containing the said cellulose compositions. Another object of the invention is the provision of a process for preparing such clear gel shampoos. A more particular object of the invention is to provide clear, high-foaming, viscous shampoos containing the said cellulose compositions. Other objects of the invention will become apparent from the following description.

Accordingly, the present invention relates to compositions comprising in combination:

(a) a hydroxypropyl methyl cellulose or a carboxy methyl cellulose,
(b) a saturated aliphatic polyalcohol containing from 5 to about 8 carbon atoms per molecule and each carbon atom thereof having one hydroxyl substituent, and
(c) a saturated aliphatic monohydric alcohol having from 1 to about 3 carbon atoms per molecule.

Such compositions are formed by mixing together (a), (b) and (c). As explained in further detail hereinafter, clear, gel shampoos containing (a), (b) and (c), together with detergent and water are also contemplated herein, as is a process for preparing the shampoo compositions.

The hydroxypropyl methyl cellulose component, (a), contemplated herein is of the water-soluble type. Methoxyl content is between about 25 and about 32 percent by weight, and is preferably of the aproximate range 28–31 percent. Hydroxypropyl content is between about 2 and about 10 percent, and preferably 2–7 percent. Such compositions are normally white, solid, soluble in water but insoluble in most organic solvents, and more soluble in cold water than in hot water. The pH of an aqueous solution is 7. Their solutions are stable over a wide pH range.

The chain length of the methyl cellulose compositions can be controlled to produce solutions covering a range of viscosities. For example, 2 percent solutions in water of suitable hydroxypropyl methyl cellulose will have viscosities ranging from averages of about 10 to 5,000 centipoises at 20° C. A preferred hydroxypropyl methyl cellulose employed herein is that having an average viscosity in 2 percent aqueous solution (hereafter referred to only as viscosity), between 10 and 5,000 centipoises, preferably between 50 and 4,000 centipoises.

Carboxy methyl cellulose compositions suitable for use herein are water-soluble. They have viscosities falling within the range given above for the hydroxypropy methyl cellulose. A particularly advantageous one is one having approximately 0.7 carboxylate group per glucose unit, and a 2 percent aqueous solution thereof in water having a viscosity (Brookfield LVF Model Viscosimeter) of 300–500 centipoises at 25° C.

It is to be understood that mixtures of hydroxypropyl methyl cellulose and carboxy methyl cellulose can be used in the compositions of this invention.

Component (b) contemplated herein is a saturated polyhydric alcohol having from 5 to about 8 carbon atoms per molecule and having one hydroxyl substituent on each carbon atom. Typical of such polyols are: erythritol, xylitol, sorbitol, mannitol, persitol, etc. Particularly preferred herein is sorbitol for the particularly advantageous results obtained therewith. The alcohol can be used in anhydrous form or in hydrous form.

Component (c) of the present invention is a saturated monohydric alcohol having from 1 to about 3 carbon atoms per molecule. Representative of such alcohols are methyl, ethyl, n-propyl, and iso-propyl. Here again, an anhydrous or an aqueous alcohol can be used. It is to be understood, however, that selection of an alcohol will depend in large part upon the final composition in which the alcohol is to be present. For example, methanol is known to be toxic and therefore is to be avoided in a cosmetic product containing the concentrated cellulose dispersions of which component (c) is a part. Also isopropyl alcohol is less suitable for use in cosmetic compositions than is ethanol. Therefore, for cosmetic compositions and shampoos, ethanol is by far the preferred component. Methanol and propanols can be used in detergent compositions for industrial and household cleaners. For example, gelled detergents containing isopropyl alcohol are contemplated for use as: floor and wall cleaning gels, general purpose cleaners on application to sponges and the like, dishwashing gels, etc.

Concentrations of components (a), (b) and (c) are critical herein. In order to obtain concentrated cellulose dispersions, the weight ratio of cellulose component (a), to the sum of polyol component, (b), and monohydric alcohol component, (c), should be from about 0.1:1 to about 0.5:1, and preferably from about 0.15:1 to about 0.35:1.

The proportion of methyl cellulose, (a), is dependent upon the desired viscosity of the final product and also upon the gel forming properties of that synthetic gum. The use of less than about 1 percent by weight of a final gel product, gives rise to moderately viscous liquids; more than about 30 percent in a dispersion (or 5 percent in a gelled detergent product) provides a rubbery, difficult-to-dissolve mass.

As indicated, a saturated polyhydric alcohol, (b), can not be used alone with component (a), nor can a saturated monohydric alcohol (c), be so used. Combinations of the two alcohols are used effectively, and weight ratios of (b):(c) in the approximate range of 2:3 to 3:2 are particularly advantageous.

As indicated hereinabove, concentrates containing high proportions of (a), such as hydroxypropyl methyl cellulose, are prepared in accordance with the following procedure, all parts being by weight. This involves mixing of 3 to 15 parts of the cellulose composition with a solvent comprising from about 6 to about 15 parts of polyyol such as sorbitol and about 6 to 15 parts of a monohydric alcohol such as ethanol. The preferred alcohols for the solvent compositions, as indicated earlier, are sorbitol and ethanol. Particularly preferred ratios for the solvent compositions are 1 to 1.5 parts of sorbitol for each part of ethanol. The cellulose composition is added to the solvent system, with no particular care being required for addition of the cellulose compositions. During addition of the cellulose composition, the solvent is agitated. Generally, temperatures ranging from about 60° F. to about 100° F. are employed. A smooth, thin slurry is obtained. The resulting dispersion can be allowed to deaerate by settling or can be successfully vacuum-deaerated.

In contrast to the solvent systems described directly above, ethanol alone is not satisfactory since a considerably greater amount of ethanol is required to disperse a given amount of cellulose composition than is required with the multi-component solvent of this invention. The large amount of ethanol serves to seriously reduce the viscosity. When sorbitol is used alone, the cellulose composition disperses well but the premature swelling occurs, resulting in a most unsatisfactory product. Another contrast is offered with propylene glycol or glycerine as a single solvent. With such single solvents, dispersions appeared to be satisfactory, however, after a short time interval, the dispersions became more viscous and lumps of gum were noted.

Concentrated dispersions are illustrated in the following examples in which all parts are by weight.

EXAMPLE 1

A concentrated dispersion was formed by mixing, at about 80° F., 2.5 parts by weight of hydroxypropyl methyl cellulose (60 HG 4000) with a mixture of 6 parts of sorbitol (70%, 30% aqueous), 4 parts of ethanol and 10 parts of triethanolamine lauryl sulfate solution (40% active in water). The smooth, thin, slurry which formed was deaerated when allowed to settle.

EXAMPLES 2–3

Concentrated dispersions were formed of the following materials according to the procedure described above in Example 1.

| | Examples | |
|---|---|---|
| | 2 | 3 |
| Sorbitol, 70% (30% aqueous) | 6 | 6 |
| Ethanol | 4 | 4 |
| Triethanolamine lauryl sulfate solution, 40% active in water | 10 | 10 |
| Lauric-myristic diethanolamide | 6 | |
| Hydroxypropyl methyl cellulose 60 HG 4,000 (Dow Chemical Methocel) | 3 | 3.5 |

As indicated in the foregoing examples, some water and minor amounts of anionic detergent and alkylolamide can be present. The amount of water is limited by the early swelling of the cellulose material in the process. However, such water serves as a solvent, together with other solvent components. The dispersions are readily pumpable.

Novel shampoo compositions of the present invention contain as the active ingredient, anionic sulfated and sulfonated detergents (including suitable mixtures thereof). Included therein are the aliphatic sulfated or sulfonated agents, such as the aliphatic acyl-containing compounds wherein the acyl radical has about 8 to 22 carbon atoms, and more particularly, the aliphatic carboxylic ester type, containing at least about 10 and preferably about 12 to about 26 carbon atoms to the molecule. Among the aliphatic detersive compounds, it is preferred to use the sulfated aliphatic compounds having about 12 to 22 carbon atoms. As suitable examples of aliphatic detergents may be found the sulfuric acid esters of polyhydric alcohols incompletely esterified with higher fatty acids, e.g. coconut oil monoglyceride mono sulfate, tallow diglyceride monosulfate; the long chain pure or mixed higher alkyl sulfates, e.g. lauryl sulfate, cetyl sulfate, higher fatty alcohol sulfates derived from reduced coconut oil fatty acids; the hydroxy sulfonated higher fatty acid esters, e.g. higher fatty acid esters of 2,3 dihydroxy propane sulfonic acid; the higher fatty acid esters of low molecular weight alkylol sulfonic acids, e.g. oleic acid ester of isethionic acid; and higher fatty acid ethanolamide sulfates; the higher fatty acid amides of amino alkyl sulfonic acids, e.g. lauric amide of taurine, and the like.

Within the ambit of the invention are the alkyl aryl sulfonate detergents also. These aromatic sulfonate detergents are also known in the art. They may be mononuclear or poly-nuclear in structure. More particularly the aromatic nucleus may be derived from benzene, toluene, xylene, phenol, cresols, naphthalene, etc. The alkyl substituent on the aromatic nucleus may vary widely, as long as the desired detergent power of the active ingredient is preserved. While the number of sulfonic acid groups present on the nucleus may vary it is usual to have one such group present in order to preserve as much as possible a balance between the hydrophilic and hydrophobic portions of the molecule.

More specific examples of suitable alkyl aromatic sulfonate detergents are the higher alkyl aromatic sulfonates. The higher alkyl substituent on the aromatic nucleus may be branched or straight-chain in structure; it comprises moreover such groups as decyl, dodecyl, keryl, pentadecyl, hexadecyl, mixed long-chain alkyls derived from long-chain fatty materials, cracked paraffin wax olefins, polymers of lower monoolefins, etc. Preferred examples of this class are the higher alkyl mononuclear aryl sulfonates wherein the alkyl group is about 8 to about 22, and preferably about 12 to 18 carbon atoms. More particularly, it is preferred to use the higher alkyl benzene sulfonates wherein the higher alkyl group is about 12 to 16 carbon atoms. For example, propylene may be polymerized to the tetramer and condensed with benzene in the presence of a Friedel-Crafts catalyst to yield essentially the dodecylbenzene derivative which is suitable for sulfonation to the desired sulfonate compounds.

Still other detergents suitable for use herein include: alkyl sulfonates; N-lauroyl sarcosinates; polypeptide condensates; generally referred to as "Maypons"; and alpha-sulfo methyl esters of myristic and like acids, in the form of their sodium and triethanolamine salts.

These various anionic detergents are to be used in the form of their water soluble salts such as the amine, alkali metal and alkaline earth metal salts. While the sodium, potassium salts and the like may be suitably employed, it is preferred to use the ammonium, lithium, magnesium, amine and alkylolamine salts in view of their generally greater solubility in aqueous solution. More particularly, it is preferred to use the monoethanolamine, diethanolamine, triethanolamine salts and mixtures thereof because of the excellent results attained with their use, particularly with the higher alkyl benzene sulfonates, the higher alkyl sulfates, and the higher fatty acid monoglyceride sulfates (and mixtures thereof) as the active ingredients.

Particularly preferred herein are triethanolamine lauryl sulfate and also magnesium lauryl sulfate.

Suitable also for use in shampoo compositions of this invention are dialkylolamides of higher fatty acids of about 10–14 carbon atoms per molecule, as represented by the formula:

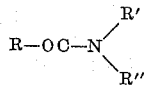

wherein R—OC represents a fatty acyl radical of 10–14 carbon atoms, and R' and R" may be the same or different, each being a lower hydroxyalkyl group of preferably up to about 5 and more particularly, from about 2 to about 5 carbon atoms. The hydroxyalkyl groups may be mono- or polyhydroxy alkyl. Examples of suitable additives are N,N bis (2 hydroxyethyl) lauramide, N,N bis (2 hydroxyethyl) myristamide, N,N bis (2 hydroxyethyl) capramide, N,N bis (2,3 dihydroxypropyl) lauramide, N,N bis (2,3 dihydroxypropyl) myristamide, N,N bis (3-hydroxypropyl) lauramide, N,N bis (3 hydroxypropyl) capramide, N,N bis (2 hydroxypropyl) myristamide, N,N bis (4 hydroxybutyl) lauramide, etc. Because of the excellent results obtained it is preferred to use the diethanolamide compounds and the additives possessing a fatty acyl radical of 12–14 carbonatoms.

These dialkylolamides may be prepared in any suitable manner and numerous processes for their production are well known in the art. A convenient and economical mode of synthesis involves the condensation of the higher fatty acylating compounds (e.g. lauric acid, lauric acid halide, etc.) with a suitable amino compound to produce a reaction product having the desired amide structure.

The higher fatty acylating substance may be derived from pure, impure or commercial grades of capric, lauric or myristic acids and the like. More particularly, these acids may be produced from fatty oils, fats, greases, and other natural sources or be of synthetic origin as derived from the oxidation of hydrocarbons. According to its origin and the degree and manner of purification, capric, lauric and myristic acids may be commonly admixed or associated with other fatty acids of higher and lower molecular weight. It is within the scope of the invention that the capryl, lauroyl and myristoyl compounds may be associated with other fatty substances and the like provided the character and amount of such other materials are not sufficient to substantially neutralize or materially affect the enhancing power of the additives in the relationship set forth. Thus, there may be suitably employed for the preparation of the dialkylolamide additives the commercially pure capric, lauric and myristic acids having a concentration of such acids of about 90 percent and above. A typical composition of commercially pure lauric acid may be 90 percent lauric acid, 9 percent myristic acid, 1 percent unsaturated acids, trace capric acid. Another suitable fatty acid mixture is "topped" coconut oily fatty acids produced by the removal of a low-boiling fraction, e.g. 10–15 percent, from coconut oil fatty acids.

According to the circumstances of manufacture of the dialkylolamide, it may be chemically and/or physically associated with other materials such as soap, free alkylolamine, piperazine type derivatives, etc. The presence of varying amounts of such materials and the like in admixture with dialkylolamide is contemplated within the scope of the present invention, provided the same are not significant enough to materially neutralize or substantially adversely affect the desired improvements to be accomplished with the combination of the anionic detergent and the dialkylolamide additive.

Monoalkylolamides such as lauric monoethanolamide and lauric isopropanolamide are also advantageous herein.

Water can also be present in both the concentrated methyl cellulose dispersions and other compositions including shampoos. In the methyl cellulose concentrates, water is generally present in amounts up to about 40 percent by weight of the concentrate, and preferably from about 25 to about 35 percent. Similarly, in gelled shampoos water will generally be present within the range of about 35 to about 75 percent and preferably 45 to 55 percent by weight.

In general, the shampoo compositions of the present invention will contain from about 5 to about 35 percent by weight, and preferably from about 10 to 25 percent of detergent. The shampoos will also contain components (a), (b) and (c):

| | Percent by Weight | |
|---|---|---|
| | Broad Range | Preferred Range |
| (a) | 1–5 | 1.5–3.5 |
| (b) | 2–15 | 4–8 |
| (c) | 3–10 | 4–8 |

In addition to the foregoing components of shampoos contemplated herein, additional additives or compounds can be present in customary concentrations, unless otherwise specified below. These include: preservatives such as formalin; dyes such as those certified by the Food and Drug Administration; opacifiers such as water-soluble fatty acid esters of aliphatic alcohols, typical of which are polygloycol stearates and ethylene glycol distearate; perfumes such as those conventionally used in cosmetic products, bacteriostats such as hexachlorophene, bithionol, polyhalogenated salicylanilides, and trichloro carbanilide; etc. In addition to such materials, conventional soaps can also be included in relatively small concentration, up to about 2 to 3 percent by weight. Representative of such soaps are potassium laurate, potassium oleate and, more particularly, triethanolamine soaps.

Still other agents useful herein include ethoxylated lanolins and liquid lanolin fractions. Buffering agents, such as citric acid, can be used for pH control. The pH of the shampoo compositions of this invention should range from about 3.5 to about 8.5 with preference given to those in the range from 7.2 to 8.0.

The concentrated methyl cellulose dispersions developed herein are particularly suitable for use in forming extrudable, gel-form clear shampoos. The shampoos are formed in a two-stage procedure in which the concentrate is first mixed with a detergent and thereafter an aqueous solution of the same of different detergent is mixed with the initial composition. The two components can be readily mixed together at room temperature (for example, about 20–25° C.).

Shampoos are illustrated with the following examples wherein all parts are by weight.

EXAMPLE 4

An excellent shampoo composition is one prepared at room temperature (about 20° C.) by mixing together part I and II, identified below, with gentle stirring:

Part I

Sorbitol (70% in H₂O) _____ 6
Ethanol _____ 4
Lauric-myristic diethanolamide _____ 6
Triethanolamine lauryl sulfate [1] _____ 10
Perfume _____ 0.4
To which is added: Hydroxypropyl methyl cellulose (60 HG 4000; Dow Chemical Methocel) _____ 2.0

Part II

Triethanolamine lauryl sulfate [1] _____ 60
Water _____ 11.6
Colors, preservatives, bacteriostats, antioxidants, q.s.

[1] =40% active content, aqueous solution.

The resulting product is a clear shampoo which is easy to use and rinses well from the hair when used thereon. It is characterized by excellent wetting character and spreads rapidly through hair. It imparts good luster and manageability to the hair. In the formulation given above, the triethanolamine lauryl sulfate serves to impart high foam, dense lather, effective cleaning, but with no irritation or sensitization of the skin. The lauric-myristic diethanolamide cooperates to impart greater foam and stabilization of foam in the presence of sebum, while imparting some manageability to hair and serving as a supplemental thickening aid.

EXAMPLE 5

By way of further illustration, it has been found that when magnesium lauryl sulfate is substituted for triethanolamine lauryl sulfate in the formulation shown above, that two parts of the magnesium compound will serve as well as three parts of the triethanolamine compound. And in addition, less methyl cellulose composition is required, that is, instead of 2.0 percent by weight only 1.5 percent is required to provide substantially the same results.

A particularly advantageous technique for preparing clear gel shampoos involves formation of a composition (A) by mixing together the following components, quantities representing percent by weight of the desired shampoos:

(a) 1 to 5
(b) 2 to 15
(c) 3 to 10
(d) 5 to 35, wherein (d) is a detergent. Composition (B) is also formed and comprises an aqueous solution of a detergent, which may be the same as (d) or a different detergent. Composition (A) and a quantity of composition (B) comprising from about 50 to about 80 percent by weight of the desired shampoo, are then mixed thoroughly one with the other. In this way, a clear, gel shampoo is formed.

While the present invention has been described with reference to illustrative examples and proportions, it is to be understood that by those skilled in the art that other variations and modifications of the invention can be employed without departing from the principle thereof. Thus, it would be understood that the invention is not limited to the particular types of compositions set forth in the illustrations nor to the particular ingredients recited therein. It is intended in the appended claims to cover all such variations and modifications.

I claim:

1. A process for preparing a concentrate of a synthetic cellulose gum which comprises (1) admixing a saturated polyhydric alcohol having from about 5 to 8 carbons per molecule and having 1 hydroxyl substituent on each carbon atom, a saturated monohydric alcohol having 1 to about 3 carbon atoms per molecule and water at a temperature within the range of about 60° F. to 100° F. to form a homogeneous solvent, the weight ratio of said polyhydric alcohol to said monohydric alcohol being in the range of 2:3 to 3:2; (2) adding to and dispersing in said homogeneous solvent with agitation a solid synthetic cellulose gum selected from the group consisting of water soluble hydroxypropyl methylcellulose having a methoxyl content between about 25 and about 32% and a hydroxypropyl content between about 2 and about 10% by weight, a water soluble carboxy methyl celluloese and mixtures thereof, the weight ratio of said celluose to the sum of said polyhydric alcohol and said monohydric alcohol being from about 0.1:1 to about 0.5:1, thereby forming a smooth, thin slurry containing water in an amount up to about 40 percent by weight of the concentrate.

2. The process defined by claim 1 wherein said solvent contains about 14 to 18% by weight of the concentrate of a water soluble organic, anionic non-soap detergent salt having in its molecular structure an acyl or alkyl group containing about 8 to 22 carbon atoms and a radical selected from the group consisting of sulfate, sulfonic and carboxyl radicals.

3. The process defined by claim 1 wherein the cellulose gum is said hydroxypropyl methyl cellulose.

4. The process defined by claim 1 wherein the cellulose gum is said carboxy methyl cellulose.

5. The process defined by claim 1 wherein the said ratio of said cellulose to the sum of said polyhydric alcohol and said monohydric alcohol is from about 0.15:1 to about 0.35:1.

6. The process defined by claim 1 wherein the polyhydric alcohol is sorbitol.

7. The process defined by claim 1 wherein the monohydric alcohol is ethyl alcohol.

8. A concentrated liquid dispersion of synthetic cellulose gum in the form of a smooth, thin slurry consisting essentially of: a saturated polyhydric alcohol having from 5 to about 8 carbon atoms per molecule and having one hydroxyl substituent on each carbon atom; a saturated monohydric alcohol having from 1 to 3 carbon atoms per molecule; water; and dispersed therein a synthetic cellulose gum selected from the group consisting of water soluble hydroxypropyl methylcellulose having a methoxyl content between about 25 and about 32% and a hydroxypropyl content between about 2 and about 10% by weight, a water soluble carboxy methyl cellulose and mixtures thereof; the weight ratio of said polyhydric alcohol to said monohydric alcohol being in the range from 2:3 to 3:2, the weight ratio of said cellulose to the sum of said polyhydric and said monohydric alcohol being from about 0.1:1 to 0.5:1 and the amount of water being up to about 40% by weight of the liquid dispersion.

9. A concentrated liquid dispersion in accordance with claim 8 which contains about 14–18% by weight of the dispersion of a water soluble organic, anionic non-soap detergent salt having in its molecular structure an acyl or alkyl group containing about 8 to 22 carbon atoms and a radical selected from the group consisting of sulfate, sulfonic and carboxyl radicals.

10. A composition defined by claim 8 wherein the ratio of said cellulose to the sum of said polyhydric alcohol and said monohydric alcohol is from about 0.15:1 to about 0.35:1.

11. A composition defined by claim 8 wherein the cellulose gum is said hydroxypropyl methyl cellulose.

12. A composition defined by claim 8 wherein the polyhydric alcohol is sorbitol.

13. A composition defined by claim 8 wherein the monohydric alcohol is ethyl alcohol.

14. A process for preparing a clear liquid gel shampoo consisting essentially of by weight 1 to 5% of a synthetic cellulose gum selected from the group consisting of water soluble hydroxypropyl cellulose having a methoxyl content between about 25 and 32% and a hydroxypropyl content between about 2 and about 10% by weight, a water soluble carboxyl methyl cellulose and mixtures thereof, 2 to 15% of a saturated polyhydric alcohol having from about 5 to 8 carbons per molecule and having one hydroxyl substituent on each carbon atoms, 3 to 10% of a saturated monohydric alcohol having from 1 to about 3 carbon atoms per molecule, 5 to 35% of a water soluble organic anionic non-soap detergent salt having in its molecular structure an acyl or alkyl group containing about 8 to 22 carbon atoms and a radical selected from the group consisting of sulfate, sulfonic and carboxyl radicals and 35 to 75% water which comprises: preparing a concentrate containing said cellulose by admixing said polyhydric alcohol with said monohydric alcohol and water at a temperature within the range of about 60° F. to 100° F. to form a homogeneous solvent wherein the weight ratio of said polyhydric alcohol to said monohydric alcohol is in the range of 2:3 to 3:2; adding to and dispersing in said homogeneous solvent with agitation said cellulose in solid form, the weight ratio of said cellulose to the sum of said polyhydric alcohol and said monohydric alcohol being from about 0.1:1 to about 0.5:1, to form a smooth, thin slurry containing water in an amount up to about 40% by weight of the concentrate; preparing an aqueous detergent solution by admixing the balance of said water and said anionic detetrgent salt; admixing said cellulose-containing concentrate with said aqueous detergent solution, said aqueous detergent solution comprising from about 50 to 80% of said shampoo, to form a clear gelled shampoo composition.

15. The process defined by claim 24 wherein the solvent for the cellulose dispersion contains about 14 to 18% by weight of the concentrate of a water soluble organic anionic non-soap detergent salt having in its molecular structure an acyl or alkyl group containing about 8 to 22 carbon atoms and a radical selected from the group consisting of sulfate, sulfonic and carboxyl radicals.

16. The process defined by claim 14 wherein the cellulose gum is said hydroxypropyl methyl cellulose.

17. The process defined by claim 14 wherein the polyhydric alcohol is sorbitol.

18. The process defined by claim 14 wherein the monohydric alcohol is ethyl alcohol.

19. A clear, gel shampoo consisting essentially of:

| | Percent by wt. |
|---|---|
| (a) a synthetic cellulose gum selected from the the group consisting of water soluble hydroxypropyl methylcellulose having a methoxyl content between about 25 and about 32% and a hydroxypropyl content between about 2 and about 10% by weight, a water soluble carboxy methyl cellulose and mixtures thereof | 1 to 5 |
| (b) a saturated polyhydric alcohol containing from 5 to about 8 carbon atoms per molecule and each carbon atom thereof having one hydroxyl substituent | 2 to 15 |
| (c) a saturated aliphatic monohydric alcohol having from 1 to about 3 carbon atoms per molecule | 3 to 10 |
| (d) a water soluble, organic anionic, non-soap detergent salt having in its molecular structure an acyl or alkyl group containing about 8 to 22 carbon atoms and a radical selected from the group consisting of sulfate, sulfonic and carboxyl radicals | 5 to 35 |
| (e) water, wherein the weight ratio of said polyhydric alcohol to said monohydric alcohol is in the range of 2:3 to 3:2 and the weight ratio of said cellulose to the sum of said polyhydric and said monohydric alcohol is about 0.1:1 to 0.5:1 | 35 to 75 |

20. The shampoo defined by claim 19 wherein the cellulose gum is said hydroxypropyl methyl cellulose.

21. The shampoo defined by claim 19 wherein the polyhydric alcohol is sorbitol.

22. The shampoo defined by claim 19 wherein the monohydric alcohol is ethyl alcohol.

References Cited

UNITED STATES PATENTS

| | | | |
|---|---|---|---|
| 2,447,462 | 8/1948 | Harsh et al. | 106—197 |
| 2,607,740 | 8/1952 | Vitale et al. | 252—152 |
| 2,773,835 | 12/1956 | Anderson | 252—153 |
| 2,994,665 | 8/1961 | Reich et al. | 252—137 |
| 3,085,067 | 4/1963 | Anderson | 252—153 |
| 3,136,696 | 6/1964 | Harrison | 106—197 |
| 3,179,595 | 4/1965 | Olson | 252—118 |

OTHER REFERENCES

Methocel, publication of the Dow Chemical Co., 1957, pp. 1, 9, 10, 12, 13, 21, 34 and 35.

LEON D. ROSDOL, *Primary Examiner.*

ALBERT T. MEYERS, *Examiner.*

I. GLUCK, *Assistant Examiner.*

UNITED STATES PATENT OFFICE
CERTIFICATE OF CORRECTION

Patent No. 3,325,416                                     June 13, 1967

Gordon Trent Hewitt

It is hereby certified that error appears in the above numbered patent requiring correction and that the said Letters Patent should read as corrected below.

Column 5, line 38, for "substance" read -- substances --; column 6, line 32, for "polygloycol" read -- polyglycol --; line 61, for "part I and II" read -- Part I and Part II --; column 7, line 70, for "celluloese" read -- cellulose --; column 8, line 64, for "atoms" read -- atom --; column 9, line 10, for "detetrgent" read -- detergent --; line 15, for the claim reference numeral "24" read -- 14 --; line 32, strike out "the".

Signed and sealed this 11th day of February 1969.

(SEAL)
Attest:

Edward M. Fletcher, Jr.                                EDWARD J. BRENNER
Attesting Officer                                         Commissioner of Patents